United States Patent [19]

Johnson et al.

[11] 4,216,133

[45] Aug. 5, 1980

[54] SHELL PROCESS FOUNDRY RESIN COMPOSITIONS

[75] Inventors: Calvin K. Johnson, Palos Heights; Robert S. Craig, Hoffman Estates, both of Ill.

[73] Assignee: Acme Resin Corporation, Forest Park, Ill.

[21] Appl. No.: 889,061

[22] Filed: Mar. 22, 1978

[51] Int. Cl.$^2$ .......................... C08K 3/34; C08K 3/36
[52] U.S. Cl. ....................................... 260/38; 428/407
[58] Field of Search ......................... 260/38, DIG. 40; 428/407

[56] References Cited

U.S. PATENT DOCUMENTS

| | | | |
|---|---|---|---|
| 3,453,229 | 7/1969 | Steck | 260/38 |
| 3,660,121 | 5/1972 | McCarthy | 260/38 X |
| 3,838,095 | 9/1974 | Johnson et al. | 260/38 |
| 3,954,695 | 5/1976 | Clelond | 260/38 |
| 4,048,134 | 9/1977 | Courtenay et al. | 260/38 |
| 4,163,741 | 8/1979 | Zhukonsky et al. | 260/38 X |

*Primary Examiner*—S. M. Person
*Attorney, Agent, or Firm*—Stanley M. Parmerter

[57] ABSTRACT

Shell process foundry resin compositions containing novolak resins are improved by incorporating therein from about 0.5 to about 10 percent, based on the weight of the resin, of a finely divided, siliceous material such as fumed silica, bentonite, kaolin clay and attapulgus clay. The presence of the siliceous material provides resistance to peelback during the formation of sand shells and increases the stripping strengths of the incompletely cured molds.

31 Claims, No Drawings

SHELL PROCESS FOUNDRY RESIN COMPOSITIONS

This invention concerns shell process foundry resin compositions and sands coated with such compositions. More particularly, it relates to shell process foundry resin compositions in which a novolak resin is employed together with a minor amount of a finely divided siliceous material which provides peelback resistance and increased stripping strength.

Resin binders have been employed heretofore in the preparation of consolidated materials by bonding discrete inert solid particles such as sand, abrasive grit, wood chips, and a suitable binder.

The shell molding process for the production of sand mold sections for the casting of metals is well known in the prior art. While there are many variations of this process, the process essentially comprises depositing a combination of sand and potentially thermosetting resin against a heated pattern such that the resin melts and cures to form a rigid shell mold or core section for use in the casting of metals. The combination of resin and sand used in the process can be a mixture of powdered resin and sand, or a free flowing coated sand in which each grain is coated with a non-tacky layer of resin.

The production of a shell or mold involves two basic steps, the invest and the cure step. In the first step, the resin coated sand is dumped onto or blown against a heated metal pattern. The resin coated sand is held against the pattern (invested) until the shell is thick enough to hold metal in a given application. The time required for this operation is called the invest time. The faster the shell forms, the shorter the invest time can be. The rate at which the shell forms is known as the buildup rate. The faster the buildup rate, the shorter the invest time. In the second step, the resin coated sand is dumped or dropped away from the shell of bonded coated particles of sand and the resulting shell is cured. After the shell is cured, it is removed from the hot metal pattern and is ready for use. Therefore, reducing the cure time required also can accelerate the production of shell cores or molds.

Phenolic resins are known to be particularly useful in the shell molding process. For shell molding, two-step phenol-formaldehyde resins (also known as novolaks) which are potentially thermosetting are employed. Thermoplastic phenol-formaldehyde novolak resins can be made potentially thermosetting by incorporating a curing agent such as hexamethylenetetramine. (Useful examples of potentially thermosetting phenolic resin coated sands are disclosed in U.S. Pat. Nos. 2,706,163 and 2,888,418.)

The shell process of preparing sand molds is generally as follows: Foundry sand is heated, for example to a temperature of about 130° C., and mixed, or "mulled", with a minor amount of the novolak resin, a curing agent, and, usually, a mold lubricant. Mulling is continued until the resin composition uniformly coats the sand grains. The coated sand is cooled and placed in the dump box of a shell mold machine. It is then dumped, or "invested", onto a hot, metal, half-mold pattern to a depth of several inches. The heat from the pattern quickly causes the resin on the sand grains within about ½ inch of the pattern to become thermoset, thereby forming a rigid sand shell. The coated pattern is then inverted to allow the unattached sand to fall away and be reused. The coated pattern is then placed in an oven and heated for a further time to complete the cure of the resin composition. When the cure is complete, pattern and shell are removed from the oven, following which the shell is stripped from the pattern ready to be mated to a complementary shell and used to form metal castings.

Paramount among the properties which a foundry resin composition must have to be suitable for use in the shell process are resistance to peelback and high tensile strength.

Peelback refers to a problem that frequently occurs in practice of the shell process at the point after invest where the coated metal pattern is inverted to release the unattached sand. It is desired that the sand which is attached to the pattern have a relatively uniform thickness such as from about 3/16 to about 1 inch and even heavier in special applications. Sometimes, however, clumps of the sand, although initially adhered to the pattern, will fall away or peelback from the shell before final curing can be accomplished. This is a particular problem when thicker shells are being produced as the heavier material more easily peels during the inversion. As a result, either the thickness of the shell will be reduced at that point, or in a severe case, a hole will be formed in it. When peelback occurs and is noticed, the shell has to be scrapped, at the sacrifice of sand, resin, and time. If it goes unnoticed and the mold is used for casting, rupture of the mold and loss of the casting might occur.

Some of the solutions to peelback which have heretofore been proposed have entailed the addition of relatively expensive organic reagents to the resin composition. See, e.g., U.S. Pat. Nos. 3,635,877 and 3,020,254. Either approach adds significantly to the expense of the overall foundry operation. Accordingly, there is a need for a less costly, yet effective, solution to the peelback problem.

We have found that peelback resistance can be imparted to a novolak foundry resin composition by including in the composition about 0.5 to 10 percent, preferably 2 to 6 percent, based on the weight of the resin, of a finely divided, siliceous material such as fumed silica, bentonite, kaolin clay, and attapulgus clay. It is believed that the incorporation of the siliceous material controls the viscosity during the cure which reduces the tendency to peel.

The addition of siliceous material to the resin gives a further unexpected benefit. Its presence allows the use of excess phenol in the cold resin flakes without the usual caking problems which are encountered when excess phenol is present.

It is, of course, necessary that the siliceous material be compatible with the novolak resin as well as with the variety of conventional adjuvants which may also be incorporated into the formulation. It is important to note that the siliceous material is added to the resin material and is not merely added to the sand mixture in the muller. Moreover, the presence of the siliceous material in the resin compositions of the present invention not only improves peelback resistance, it also reduces the caking tendency of the coated foundry sand, increases the stripping strength of the cured sand molds and provides an improvement in build-up rate.

The generally preferrred novolak resin for the compositions of the present invention is an acid catalyzed reaction product of an aldehyde with a phenolic compound in a ratio of about 0.5 to 0.85 mole of aldehyde per mole of phenolic compound. Most preferred are phenol-formaldehyde resins containing about 0.7 to 0.8 mole of formaldehyde per mole of phenol.

Conventionally used as catalysts in the preparation of novolak resins are acids such as hydrochloric acid, sulfuric acid, sulfamic acid, oxalic acid, maleic anhydride, phosphoric acid, toluenesulfonic acid, and phenolsulfonic acid. Metal salt catalysts may also be used.

The curing agent for the novolak resin, preferably hexamethylenetetramine, is included in the mixture of sand and resin in an amount effective to promote thermosetting of the resin at the cure temperatures. Usually an amount of curing agent in the range of about 7 to about 20 percent, based on the weight of the resin, will suffice.

Preferably although not essential, the bonding resin composition will also include an effective amount of a release agent, e.g., from about 1 to about 10 percent, based on the weight of the resin. The presence of the release agent facilitates the separation of the final cured shell or core from the metal pattern. Most preferred are compounds containing one or more fatty carbonyl groups, e.g., stearyl or oleyl groups. Examples of suitable release agents are ethylenediamine-bis-stearyl amide and calcium stearate.

Other adjuvants commonly used in shell process foundry resins such as salicylic acid, and lignin-type resins may also be added.

Fumed silica is an amorphous material prepared at very high temperatures, for example by reacting silicon tetrachloride with hydrogen and oxygen in a flame. Its particle size is generally in the range of about 10 to 50 millimicrons, and its surface area can vary from about 50 to about 400 square meters per gram. Fumed silica is relatively pure, having an $SiO_2$ content of at least about 99 wt.% (dry basis).

Bentonite is a type of clay composed primarily of montmorillonite minerals. In finely divided form bentonite usually has a particle size small enough that 90% or more will pass through a 200 mesh screen (Tyler). Bentonite has a low surface area, usually no more than about 15 square meters per gram as calculated by the B.E.T. nitrogen adsorption method. Preferred for use in the practice of the present invention are the Western and Southern bentonites. Western bentonites, sometimes referred to as Wyoming bentonites, are naturally swelling types containing a substantial amount, e.g., about 2 wt.% or more (dry basis), of sodium cations. Southern bentonites include a substantial amount of calcium cations.

Preparation of the shell process foundry resin compositions of the present invention is preferably accomplished by first preparing the novolak resin in aqueous solution and then evaporating water from the mixture under reduced pressure, for example at temperatures up to about 150° C. The siliceous material may be added either before or after water removal. Following water removal, the resinous mixture is solidified by cooling and, preferably, is particulated, for example is flaked by cooling on flaker rolls. If it is desired to include a release agent in the resin composition, it can be done in the conventional manner. The solid particle form resin mixture can be used immediately or stored.

The foundry resin compositions of the present invention can be employed in the usual manner to form sand molds.

Generally, the process of coating sand with resin involves placing the sand in any one of several types of mixers commonly used in foundry work. Examples of these are: the Beardsley-Piper speed muller and the Simpson muller. To this sand is added from about 1% to about 8%, preferably 1% to 6%, by weight of sand, of the resin, and a suitable amount of curing agent, for example, hexamethylenetetramine to render the novolak resin potentially thermosetting. An amount of curing agent suitable for rendering the resin thermosetting is from about 7% to about 20% by weight of the resin. The components are heated to a suitable mixing temperature and mixed to coat each of the sand grains with a layer of the resin and curing agent. After the sand is coated with resin, the coated sand is cooled to room temperature, as for example by quenching with water. The mixing is continued for a sufficient time to obtain a free-flowing product.

An alternate process for coating sand with resin may be employed. Novolak resin containing the siliceous material is dispersed in a suitable solvent such as water, low-boiling alcohols, low-boiling ketones or combinations thereof. This dispersion, together with a suitable amount of curing agent, is added to sand in the mixer. The mixture is mulled with or without heating until the solvent has evaporated. At this point a free-flowing resin coated sand is obtained.

Practically any sand may be used to form shells and cores for metal casting. Examples of those which are often preferred are lake sand, bank sand, relatively pure silica sand, olivine sand, zircon sand, and chromite sand.

Practice of the present invention will be exemplified by the following examples, wherein the expression "parts" refers to parts by weight, unless otherwise stated.

EXAMPLE 1

This example illustrates the preparation of a shell process foundry resin composition of the present invention.

To a vessel equipped with a reflux condenser is added, with stirring, 2000 parts of phenol, 20 parts of sulfamic acid, and 80 parts of water. Into the resulting solution is added slowly, with stirring, 919 parts of a 50 wt.% aqueous solution of formaldehyde. The rate of addition of the formaldehyde solution is controlled so as to hold the reaction mixture at reflux temperature. Stirring is continued for 90 minutes after completion of the formaldehyde addition, while applying an external source of heat to hold the temperature of the reaction mixture at about 100° C.

Water is then evaporated from the reaction mixture by heating under atmospheric pressure, until the temperature of the mixture reaches 139° C. At that point there is added to the reaction mixture 120 parts of ethylenediamine-bis-stearyl amide and the mixture is stirred for an additional 30 minutes, while held at a temperature of above about 130° C. Forty-four parts of Western bentonite is then added to the resin and the mixture is stirred for an additional 30 minutes, following which water evaporation is resumed by heating under subatmospheric pressure (28 inches vacuum) until the molten resin reaches a temperature of 143° C. The resinous mixture is then solidified in flake form by passing it over cooled flaker rolls.

EXAMPLE 2

This example also illustrates the preparation of a shell process foundry resin composition of the present invention.

The procedure of Example 1 is repeated, but using 44 parts of fumed silica (Cab-O-Sil M5 ®) in place of the Western Bentonite.

EXAMPLE 3

This example likewise illustrates the preparation of a shell process foundry resin composition of the present invention.

The procedure of Example 1 is repeated, but using 44 parts of Southern bentonite in place of the Western bentonite.

EXAMPLE 4

This example illustrates the preparation of resin coated foundry sand of the present invention, and its use in preparing shell molds.

One hundred pounds of Wedron 7020 foundry sand is heated to 130° C. and placed in a Simpson Porto Muller. To the heated sand is then added 1331 grams of one of the flaked resin compositions of Examples 1–3, and the mixture is mulled for 90 seconds, causing the resin composition to melt and coat the sand grains. Then a solution of 192 grams of hexamethylenetetramine in 800 ml of water is added to the muller. Mulling is continued until the coated sand is free flowing, at which point it is discharged from the muller and placed in the dump box of a Shalco shell molding machine.

A metal pattern is heated to 260° C., following which the coated foundry sand in the dump box is inverted onto the hot pattern surface. After one or two minutes the pattern is inverted, held inverted for a similar period of time. The hardened sand shell is then easily separated from the pattern.

To measure the peelback inhibiting effect of the presence of the finely divided siliceous material in the foundry resin compositions of the present invention, sand shells were prepared in the manner described in Example 4, above, using each of the foundry resin compositions described in Examples 1, 2 and 3, as well as a control resin composition prepared in the manner described in Example 1, but without the addition of the siliceous material. Peelback was visually estimated as that percent of the initially adhered sand which fell from the metal pattern when it was inverted. The results were as follows:

| Resin Composition | Invest Time, sec. | Percent Peelback |
| --- | --- | --- |
| Control | 60 | 20 |
| Control | 120 | 100 |
| Control | 120 | 80 |
| Ex. 1 | 60 | 5 |
| Ex. 1 | 120 | 10 |
| Ex. 1 | 120 | 40 |
| Ex. 2 | 60 | 5 |
| Ex. 2 | 120 | 50 |
| Ex. 2 | 120 | 50 |
| Ex. 3 | 60 | 10 |
| Ex. 3 | 120 | 50 |
| Ex. 3 | 120 | 60 |

EXAMPLE 5

This example illustrates the use of resin coated foundry sand of the present invention to prepare shell cores.

Free-flowing, resin coated sands prepared in the manner described in Example 4 were blown into an electrically heated core box, using a Redford core blower. The core box temperature was heated to 216° C. and the blowing pressure used was 80 psig. The pattern used in the core box was a one-inch thick standard "dog bone" core. The coated sand was held in the heated pattern for 20 seconds and then the pattern was opened and the core removed.

Cores were prepared using sands coated with each of the foundry resin compositions described in Examples 1 and 2, as well as a control resin composition prepared in the manner described in Example 1, but without the addition of the siliceous material. Stripping strengths of the cores were measured immediately upon removal from the pattern, using a Dietert 401 Universal Sand Strength Tester. The results were as follows: (Average of two tests)

| Resin Composition | Stripping Strength, psi |
| --- | --- |
| Control | Crumbled (less than 15 psi) |
| Ex. 1 | 20 |
| Ex. 2 | 21 |

EXAMPLE 6

1120 Flake Phenolic Novolak resin, manufactured by Acme Resin Company was heated in a vessel to 120°–130° C. to melt the resin. The resin was stirred and 2% by weight of Kaolin clay was added and mixing continued for one hour to disperse the clay. The hot liquid resin was converted to flake by passing it over cooled flaker rolls.

Resin coated sand was prepared as described in Example 4 using the Kaolin clay containing resin described above and with 1120 fake resin as a control.

The sands were tested for peel resistance as described in Example 4. Results show that Kaolin clay dispersed in the flake improves peel resistance of the coated sand.

| Sample | Invest Time, Sec. | % Peelback |
| --- | --- | --- |
| 1120 Control | 30 | 90 |
| 1120 Control | 60 | 100 |
| 1120 + 2% Kaolin Clay | 30 | 60 |
| 1120 + 2% Kaolin Clay | 60 | 90 |

Samples of these coated sands were used to blow one (1) inch thick dog bone cores as described in Example 5. The coated sand of this invention gave higher stripping strength and also a thicker shell showing that the sand has improved build up characteristics as well.

| Sample | Stripping Strength, psi* |
| --- | --- |
| 1120 Control | 22 |
| 1120 + 2% Kaolin Clay | 32 |

*Data is average of two tests.

EXAMPLE 7

1126 Flake Phenolic Novolak resin, a shell resin containing 15% vinsol manufactured by Acme Resin Company, was heated in a vessel to 120°–130° C. to melt the resin. The resin was stirred and 4% by weight of Western bentonite was added and stirring continued for one (1) hour to disperse the bentonite. The hot liquid resin was converted to solid flake form by passing it over cooled flaker rolls.

Resin coated sand was prepared as described in Example 4 using bentonite containing resin described above and with 1126 flake resin as a control.

The sands were tested for peel resistance as described in Example 4. The results show that bentonite addition improves the peel resistance of this vinsol modified 1126 flake.

| Sample | Invest Time, Sec. | % Peelback |
|---|---|---|
| 1126 Control | 60 | 55 |
| 1126 + 4% Western Bentonite | 60 | 25 |

EXAMPLE 8

1120 Flake Phenolic Novolak resin, manufactured by Acme Resin Company was heated in a vessel to 120°–130° C. to melt the resin. The resin was stirred and 4% by weight of attapulgus clay was added and mixing continued for one hour to disperse the clay. The hot liquid resin was converted to flake by passing it over cooled flaker rolls.

Resin coated sand was prepared as described in Example 4 using the attapulgus clay containing resin described above and with 1120 flake resin as a control.

The sands were tested for peel resistance as described in Example 4. Results show that attapulgus clay dispersed in the flake improves peel resistance of the coated sand.

| Sample | Invest Time, Sec. | % Peelback |
|---|---|---|
| 1120 Control | 30 | 25 |
| 1120 Control | 60 | 100 |
| 1120 + Attapulgus Clay | 30 | 0 |
| 1120 + Attapulgus Clay | 60 | 5 |

Samples of these coated sands were used to blow one (1) inch thick dog bone cores as described in Example 5. The coated sands of this invention gave higher stripping strengths and also thicker shells showing that the sand has improve build up characteristics as well.

| Sample | Stripping Strength, psi* |
|---|---|
| 1120 Control | 20 |
| 1120 + 4% Attapulgus Clay | 25 |

*Data is average of two tests.

While the invention has been described in connection with specific embodiments thereof, it is to be understood that it is capable of further modification, and is intended to cover any variations, uses or adaptations thereof following, in general, the principles of the invention and including such departures from the embodiments disclosed herein as come within the known or customary practice in the art to which the invention pertains and as may be applied to the essential features hereinbefore set forth, and as falls within the scope of the invention.

We claim:

1. A shell process foundry resin composition consisting essentially of a mixture of an uncured novolak resin, an effective amount of a curing agent for said resin and 0.5 to 10% based on the weight of the resin of a finely divided, siliceous material selected from the group consisting of fumed silica, kaolin clay, bentonite, attapulgus clay and mixtures thereof.

2. The resin composition of claim 1 wherein the resin is the acid catalyzed reaction product of an aldehyde with a phenolic compound in a ratio of about 0.5 to 0.85 mole of aldehyde per mole of phenolic compound.

3. The resin composition of claim 1 wherein the quantity of said siliceous material is in the range of from about 0.5 to about 10 percent, based on resin weight.

4. The resin composition of claim 1 wherein the quantity of said siliceous material is in the range of from about 2 to about 6 percent, based on resin weight.

5. The resin composition of claim 1 and further including a release agent.

6. The resin composition of claim 1 wherein the mixture is in the form of flakes.

7. The resin composition of claim 1 wherein the siliceous material is fumed silica.

8. The resin composition of claim 6 wherein the siliceous material is fumed silica.

9. The resin composition of claim 1 wherein the siliceous material is kaolin clay.

10. The resin composition of claim 6 wherein the siliceous material is kaolin clay.

11. The resin composition of claim 1 wherein the siliceous material is bentonite.

12. The resin composition of claim 6 wherein the siliceous material is bentonite.

13. The resin composition of claim 1 wherein the siliceous material is attapulgus clay.

14. The resin composition of claim 6 wherein the siliceous material is attapulgus clay.

15. Foundry sand coated with:
   (1) about 1 to about 8 parts, per each 100 parts by weight of the sand, of a bonding resin composition consisting essentially of an intimate admixture of an uncured novolak resin and a finely divided siliceous material selected from the group consisting of fumed silica, kaolin clay, bentonite, attapulgus clay and mixtures thereof, the amount of said siliceous material being about 0.5 to about 10 percent, based on the weight of the resin; and
   (2) an effective amount of a curing agent for said resin.

16. The coated foundry sand of claim 15 wherein the resin is the acid catalyzed reaction product of an aldehyde with a phenolic compound in a ratio of about 0.5 to 0.85 mole of aldehyde per mole of phenolic compound.

17. The coated foundry sand of claim 16 wherein the phenolic compound is phenol and the curing agent is hexamethylenetetramine.

18. The coated foundry sand of claim 15 wherein the quantity of said siliceous material is in the range from about 2 to about 6 percent, based on the weight of the resin.

19. The coated foundry sand of claim 15 wherein the siliceous material is fumed silica.

20. The coated foundry sand of claim 15 wherein the siliceous material is kaolin clay.

21. The coated foundry sand of claim 15 wherein the siliceous material is bentonite.

22. The coated foundry sand of claim 15 wherein the siliceous material is attapulgus clay.

23. A process for forming foundry cores and molds comprising the steps of:

(1) contacting a hot pattern with a free flowing foundry sand coated with:
  (a) about 1 to about 8 parts, per each 100 parts by weight of the sand, of a bonding resin composition consisting essentially of an intimate admixture of an uncured novolak resin and a finely divided siliceous material selected from the group consisting of fumed silica, kaolin clay, bentonite, attapulgus clay and mixtures thereof, the amount of said siliceous material being about 0.5 to about 10 percent, based on the weight of the resin; and
  (b) an effective amount of a curing agent for said resin;
(2) holding the resin coated sand against the hot pattern to bond a portion of the particles of resin coated sand together to form a foundry mold or core of suitable thickness;
(3) removing unbonded particles of resin coated sand from bonded particles of sand forming the foundry mold or core;
(4) curing the foundry mold or core, the hot pattern having a temperature of from about 350° F. to about 600° F.; and
(5) removing the foundry mold or core from the pattern.

24. The process of claim 23 wherein the resin is the acid catalyzed reaction product of phenol with formaldehyde in a ratio of about 0.5 to 0.85 mole of formaldehyde per mole of phenol, and the curing agent is hexamethylenetetramine.

25. The process of claim 23 wherein the quantity of said siliceous material is in the range of about 2 to about 6 percent, based on the weight of the resin.

26. The process of claim 23 wherein the siliceous material is fumed silica.

27. The process of claim 23 wherein the siliceous material is kaolin clay.

28. The process of claim 23 wherein the siliceous material is bentonite.

29. The process of claim 23 wherein the siliceous material is attapulgus clay.

30. A sand mold prepared by the process of claim 23.

31. A sand core prepared by the process of claim 23.

* * * * *